(12) United States Patent
Fan et al.

(10) Patent No.: US 11,977,589 B2
(45) Date of Patent: May 7, 2024

(54) INFORMATION SEARCH METHOD, DEVICE, APPARATUS AND COMPUTER-READABLE MEDIUM

(71) Applicant: Baidu Online Network Technology (Beijing) Co., Ltd., Beijing (CN)

(72) Inventors: Miao Fan, Beijing (CN); Jinxing Yu, Beijing (CN); Zehao Dou, Beijing (CN); Mingming Sun, Beijing (CN); Ping Li, Beijing (CN); Haifeng Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 140 days.

(21) Appl. No.: 15/733,467

(22) PCT Filed: Mar. 6, 2019

(86) PCT No.: PCT/CN2019/077068
§ 371 (c)(1),
(2) Date: Aug. 3, 2020

(87) PCT Pub. No.: WO2019/242328
PCT Pub. Date: Dec. 26, 2019

(65) Prior Publication Data
US 2021/0103622 A1   Apr. 8, 2021

(30) Foreign Application Priority Data

Jun. 20, 2018   (CN) .......................... 201810635964.1

(51) Int. Cl.
*G06F 16/953*   (2019.01)
*G06N 5/04*   (2023.01)
*G06N 20/00*   (2019.01)

(52) U.S. Cl.
CPC ............. *G06F 16/953* (2019.01); *G06N 5/04* (2013.01); *G06N 20/00* (2019.01)

(58) Field of Classification Search
CPC .................................................. G06F 16/953
See application file for complete search history.

(56) References Cited

U.S. PATENT DOCUMENTS

| | | | |
|---|---|---|---|
| 5,867,164 A * | 2/1999 | Bornstein | G06F 16/345 |
| | | | 715/236 |
| 8,239,358 B1 * | 8/2012 | Soubbotin | G06F 16/338 |
| | | | 707/726 |

(Continued)

FOREIGN PATENT DOCUMENTS

| | | |
|---|---|---|
| CN | 101079033 A | 11/2007 |
| CN | 101097578 A | 1/2008 |

(Continued)

OTHER PUBLICATIONS

Zheng et al. "A deep learning approach for expert identification in question answering communities." arXiv preprint arXiv: 1711. 05350 (2017). (Year: 2017).*

(Continued)

*Primary Examiner* — Charles D Adams
(74) *Attorney, Agent, or Firm* — Seed IP Law Group LLP

(57) ABSTRACT

An information search method is provided. The method includes: searching for webpages related to a search request through a search engine; extracting respective texts related to the search request from respective webpages and splicing the texts to obtain a spliced text; obtaining a text segment from the spliced text; and sending the obtained text segment to the search engine, to display the obtained text segment in an information search result through the search engine. The present disclosure can bring great advantages to the search engine in terms of user experience and interaction, and can satisfy user requirements for a function of an intelligent (Continued)

question and answer. Through present disclosure, it is beneficial to directly presenting a short text with higher relevance to the search request to the user, thereby saving time in screening information for the user.

9 Claims, 7 Drawing Sheets

(56) References Cited

U.S. PATENT DOCUMENTS

| | | | |
|---|---|---|---|
| 2005/0091203 A1* | 4/2005 | Liu | G06F 16/345 |
| 2018/0365220 A1* | 12/2018 | Chakraborty | G06F 40/30 |
| 2019/0303442 A1* | 10/2019 | Peitz | G10L 15/1822 |

FOREIGN PATENT DOCUMENTS

| | | |
|---|---|---|
| CN | 101377777 A | 3/2009 |
| CN | 101576872 A | 11/2009 |
| CN | 101625680 A | 1/2010 |
| CN | 102081642 A | 6/2011 |
| CN | 103955529 A | 7/2014 |
| CN | 105183801 A | 12/2015 |
| CN | 105912631 A | 8/2016 |
| CN | 106095983 A | 11/2016 |
| CN | 107145482 A | 9/2017 |
| JP | 2004029931 A | 1/2004 |

OTHER PUBLICATIONS

Office Action for Chinese Application No. 201810635964.1, mailed on Oct. 27, 2021, 15 pages.

International Search Report, International Application No. PCT/CN2019077068, mailing date Jun. 14, 2019, 5 pages.

* cited by examiner

INFORMATION SEARCH METHOD, DEVICE, APPARATUS AND COMPUTER-READABLE MEDIUM

This application is a National Stage application of PCT international application PCT/CN2019/077068, filed on Mar. 6, 2019, which claims priority to Chinese Patent Application No. 201810635964.1, entitled "Information Search Method, Device, Apparatus and Computer-Readable Medium", and filed with the Chinese Patent Office on Jun. 20, 2018, both of which are herein incorporated by reference in their entireties.

TECHNICAL FIELD

The present application relates to a field of information search technology, and in particular, to an information search method, device, apparatus based on machine reading and a computer-readable medium.

BACKGROUND

A core of a current search engine is information search technology. Early search is manual search based on a catalog, and current search is based on computer database, including music search, shopping search, video search, image search, and the like.

Existing information search in a search engine generally includes two steps. The first step is to store information, i.e. all the information that is available to a user (such as encyclopedic knowledge of each category, current affairs news in various fields, etc.) is organized and stored in a certain suitable manner. The second step is a narrowly defined search, in which some items best meeting user requirements are searched from all stored information based on a keyword or a key feature inputted by the user.

With the development trend of diversity of user requirements and personalization, nowadays the search engine faces a very large opportunity in interactive innovation. In many cases, the user does not want to fully understand all aspects of something. Instead, he/she hopes that the search engine can accurately feed back a query intent. He/she does not intend to obtain substantial related information, but to obtain feedback information as concisely and accurately as possible. For example, when one performs a search by entering "How is Baidu stock today?" in the Baidu search engine, he/she hopes that the search engine can feedback ups and downs of the Baidu stock, or a closing price and a turnover rate. As long as the feedback of the search is accurate enough, one sentence or even one number can satisfy the user requirements. At present, search results obtained by the search engine are links for stock discussion, a webpage of Baidu stock, news and some abstracts that are not related to the search intent.

For example, "How much has XX company made in 2016" is entered in the search engine. One wants only to know an accurate number, but the first few results are the introduction of XX company, an official website and news reports related to XX company. There is no accurate response to the search.

In terms of information search, existing main methods include: a direct search method based on a Boolean search model, a similarity method and a naive Bayesian algorithm based on a probability or a vector space model, an importance analysis method based on a webpage link.

(1) In the direct search method based on Boolean search model, a Boolean condition is constructed according to user requirements. The Boolean condition is composed of "and", "if", and "not". For example, in a case that a text including the words "automatic drive" without two words of "traffic collision" is to be selected from all the texts, a Boolean condition of "automatic drive" and (not "traffic collision") may be entered.

(2) In the similarity method and the naive Bayesian algorithm based on a probability or a vector space model, a similarity or a correlation probability of the search request entered by a user with each of the texts in the database is calculated, by constructing a vector model or a probability model. Then the texts are ranked based on the similarities or association probabilities thereof in a descending order and presented to the user.

(3) In the importance analysis method based on a webpage link, particularly a famous PageRank algorithm, a relative importance of each webpage can be calculated as an important indicator for ranking search results. The user experience of the search engine is greatly improved.

The advantages and disadvantages of the above information search technology are as follows:

(1) The direct search method based on a Boolean search model has an advantage of easy operation. However, there is no way to rank texts of the search results thereof. All the texts can only be divided into being matched or being not matched with a Boolean condition, and the search results are too many or too less in general.

(2) In the similarity method and the naive Bayesian algorithm based on a probability or a vector space model, a word frequency is used as a core reference factor, an order between words and that between characters are not considered, and a true meaning of a text is not understood. Only a similarity or a correlation probability is calculated based on occurrence frequencies of different words and different characters in the text, so that an inaccurate search result is often obtained.

(3) In the importance analysis method based on a webpage link, user requirements may not met. That is because the most important webpages are often official websites or government websites. However, in most cases, these webpages are not desired, so that the user requirements may not be met.

SUMMARY

An information search method, device, apparatus and a computer-readable storage medium are provided according to embodiments of the present application, so as to at least solve the above technical problems in the existing technology.

According to a first aspect, an information search method includes:

An information search method, comprising:
  searching for webpages related to a search request through a search engine;
  extracting respective texts related to the search request from respective webpages and splicing the texts to obtain a spliced text;
  obtaining a text segment from the spliced text; and
  sending the obtained text segment to the search engine, to display the obtained text segment in an information search result through the search engine.

In conjunction with the first aspect, in a first implementation of the first aspect of the present application, a step of searching for webpages related to a search request through a search engine comprises:

ranking articles in the webpages in a descending order, according to relevance degrees of the articles with the search request; and selecting N articles with the highest relevance degrees with the search request from a ranking result, wherein N is a preset integer.

In conjunction with the first aspect, in a second implementation of the first aspect of the present application, a step of extracting respective texts related to the search request from respective webpages and splicing the texts to obtain a spliced text comprises:

calculating a similarity of each paragraph of each searched article with the search request;

selecting a paragraph with the highest similarity from each article; and splicing a plurality of selected paragraphs to obtain the spliced text.

In conjunction with the second implementation of the first aspect, in a third implementation of the first aspect of the present application, a step of calculating a similarity of each paragraph of each searched article with the search request comprises:

constructing a similarity calculation model for a paragraph and the search request; and calculating a similarity of each paragraph of the searched article with the search request through the similarity calculation model.

In conjunction with the first aspect, in a fourth implementation of the first aspect of the present application, a step of obtaining a text segment from the spliced text comprises:

constructing a machine reading comprehension model;

obtaining a continuous text segment related to the search request from the spliced text through the machine reading comprehension model.

According to a second aspect, an information search device, comprising:

a searching module configured to search for webpages related to a search request through a search engine;

an extracting module configured to extract respective texts related to the search request from respective webpages and splicing the texts to obtain a spliced text;

a reading module configured to obtain a text segment from the spliced text; and a feeding back module configured to send the obtained text segment to the search engine, to display the obtained text segment in an information search result through the search engine.

In conjunction with the second aspect, in a first implementation of the second aspect of the present application, the searching module comprises:

a ranking sub-module configured to rank articles in the webpages in a descending order, according to relevance degrees of the articles with the search request; and a first selecting sub-module configured to select N articles with the highest relevance degrees with the search request from a ranking result, wherein N is a preset integer.

In conjunction with the second aspect, in a second implementation of the second aspect of the present application, the extracting module comprises:

a similarity calculating sub-module configured to calculate a similarity of each paragraph of each searched article with the search request;

a second selecting sub-module configured to select a paragraph with the highest similarity from each article; and a splicing sub-module configured to splice a plurality of selected paragraphs to obtain the spliced text.

In conjunction with the second implementation of the second aspect, in a third implementation of the second aspect of the present application, the similarity calculating sub-module comprises:

a similarity model constructing unit configured to construct a similarity calculation model for a paragraph and the search request;

a calculating unit configured to calculate a similarity of each paragraph of the searched article with the search request through the similarity calculation model.

In conjunction with the second aspect, in a fourth implementation of the second aspect of the present application, the reading module comprises:

a model constructing sub-module configured to construct a machine reading comprehension model;

an obtaining sub-module configured to obtain a continuous text segment related to the search request from the spliced text through the machine reading comprehension model.

In a third aspect, in a possible implementation, the information search apparatus includes a processor and a storage device, the storage device is configured to store a program for supporting the above information search method executed by the information search apparatus, and the processor is configured to execute the program stored in the storage device. The information search apparatus further includes a communication interface configured for communication between the information search apparatus and another apparatus or communication network.

In a fourth aspect, a computer-readable medium is provided for storing computer software instructions used by the information search apparatus, the computer software instructions include programs involved in execution of the above information search method.

In the embodiment of the present application, the texts related to the search request may be extracted from the searched webpages, and then the splicing and obtaining may be performed, so that the obtained text fragment is displayed in the information search result by the search engine. It is beneficial to directly presenting a short text with higher relevance to the search request to the user, thereby saving time for screening user information and satisfying user requirements for an intelligent search result in scenarios such as an intelligent question and answer. For example, when a user enters a question in the search engine, an answer can be directly fed back to the user, and the feedback result is more accurate and simple, thereby saving the time of the user.

In addition, in the embodiment of the present application, by determining the similarity, the search result can be more closely matched with the search request. At the same time, in the embodiment of the present application, the similarity calculation is performed by constructing the deep neural network model. It is possible to avoid a disadvantage in the existing similarity calculation only through the word frequency. At the same time, in the embodiment of the present application, all information in the webpages or the articles can be further understood by constructing a machine reading comprehension model to obtain more accurate information.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION OF EMBODIMENTS

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

The present application provides an information search method and device. The specific processing flow and principle of the information search method and device of the embodiments of the present application are described in detail below.

Figure 1:
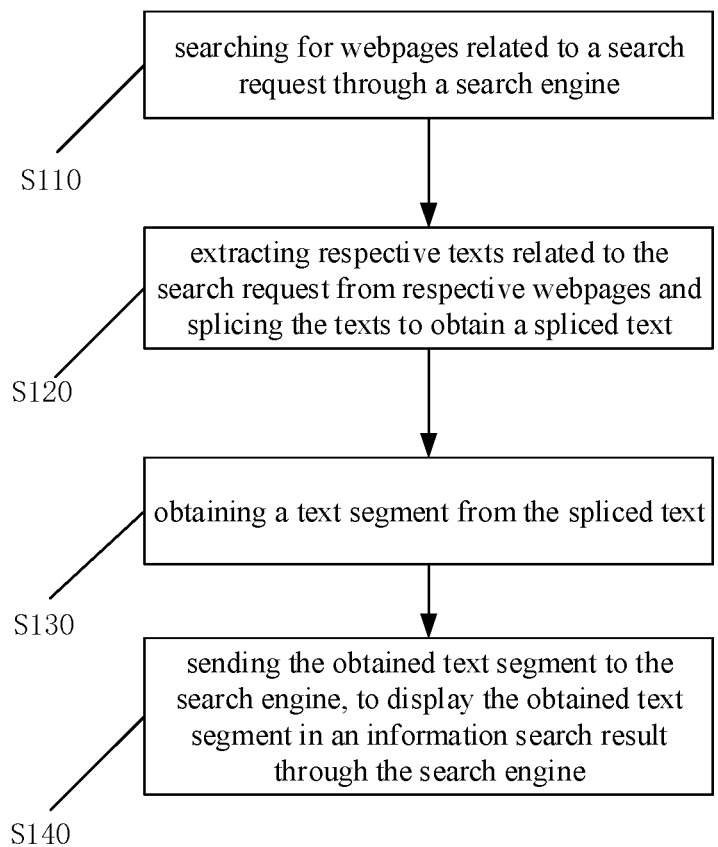
FIG. 1 is a flowchart of an information search method according to an embodiment of the present application.

As shown in FIG. 1, it is a flowchart of an information search method according to an embodiment of the present application. The information search method of the embodiment of the present application may include the following steps from S110 to S140:

S110, searching for webpages related to a search request through a search engine.

Firstly, the search request sent by a user is obtained through the search engine. The user can enter a text search request in the search engine, such as: "How is Baidu's stock today?". Then, a search can be performed to webpages related to the text by the search engine. Herein, the webpages related to the text include: general website pages, documents in various databases, and the like.

Figure 2:
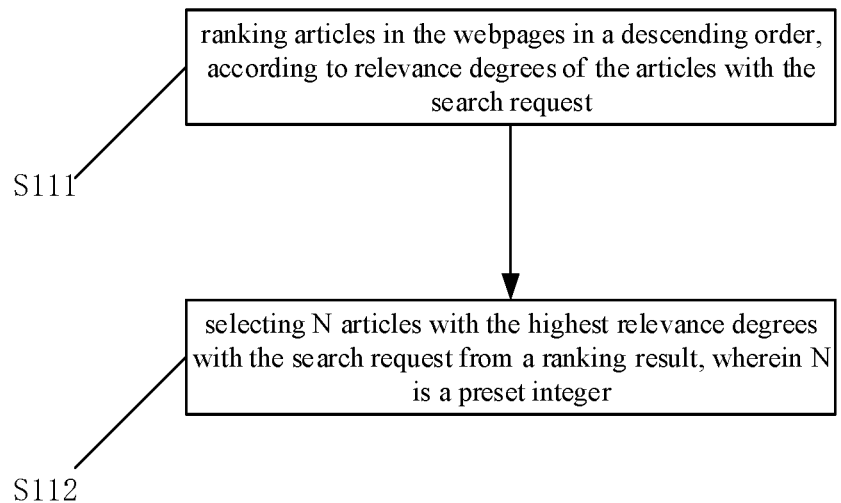
FIG. 2 is a flowchart of step S110 according to an embodiment of the present application.

As shown in FIG. 2, in an embodiment, when performing the search, the step S110 may include S111 and S112.

S111, ranking articles in the webpages in a descending order, according to relevance degrees of the articles with the search request. For example, when performing the search, a Baidu search engine can be used, which can complete automatic ranking of the related articles.

S112, selecting N articles with the highest relevance degrees with the search request from a ranking result, wherein N is a preset integer. For example, in a case that N is set to 5, the top 5 articles can be selected from the ranking result.

S120, extracting respective texts related to the search request from respective webpages and splicing the texts to obtain a spliced text. For example, if 5 articles with the highest relevance degrees are selected, some paragraphs having the highest relevance degrees with the search request can be selected from the 5 articles, and then the paragraphs may be spliced into the spliced text in a certain order.

Figure 3:
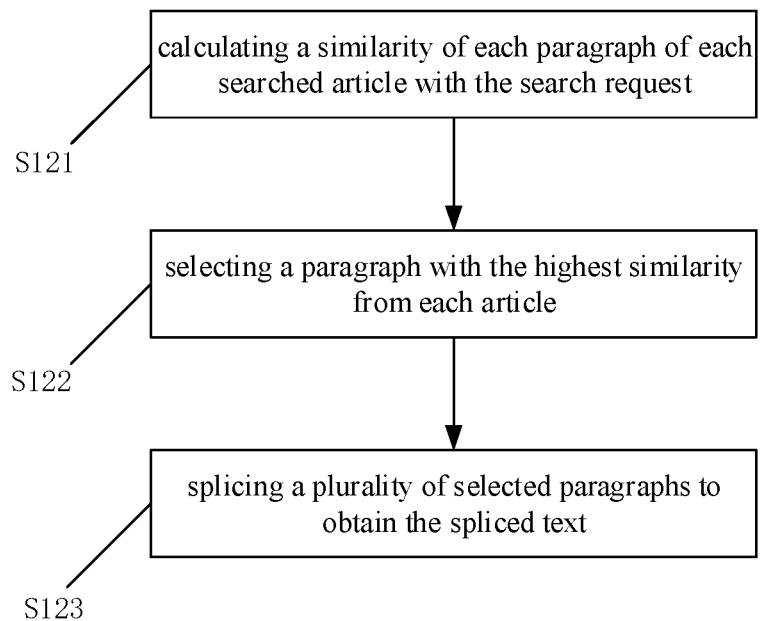
FIG. 3 is a flowchart of step S120 according to an embodiment of the present application.

As shown in FIG. 3, in an embodiment, when selecting the paragraphs, the step S120 may include steps from S121 to S123.

S121, calculating a similarity of each paragraph of each searched article with the search request.

Figure 4:
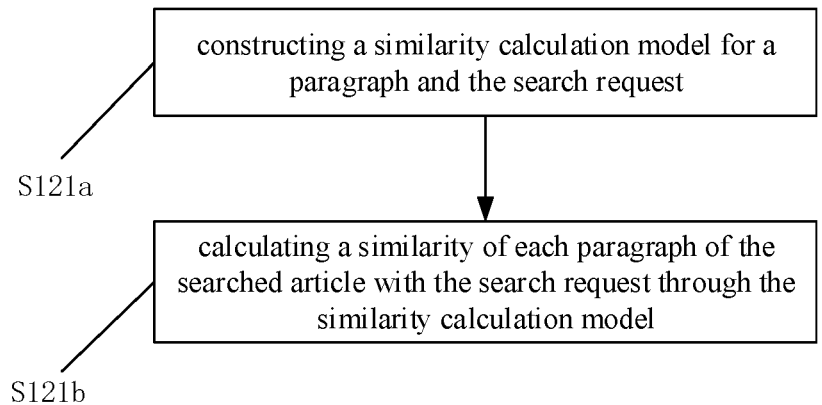
FIG. 4 is a flowchart of step S121 according to an embodiment of the present application.

For example, in the selected 5 articles with the highest relevance degrees, a similarity calculation is performed to each paragraph of each article with the search request, to obtain respective similarity scores. As shown in FIG. 4, in an embodiment, a similarity calculation model may be used to perform the similarity calculation, including steps from S121a to S121b.

S121a, constructing a similarity calculation model for a paragraph and the search request.

Herein, a machine learning algorithm is mainly used in this step to train a model for calculating the similarity of the user search request Q and the paragraph in the article. The training data may include: Chinese corpus (such as DuReader) and English corpus (such as MS-MARCO). These two corpora can be obtained in the following exemplary manner. A large number of the user search requests Q and corresponding returned web pages or articles are collected respectively in the search engines such as Baidu, and the like. At the same time, one or more text fragments are selected from certain paragraphs of these articles or web pages as feedback to the user search request Q through performing a large amount of professional labeling. In the machine learning algorithm, the above Chinese or English corpus is mainly used to construct a model that can be used to automatically determine a similarity value of the user search request Q and a paragraph.

S121b, calculating a similarity of each paragraph of the searched article with the search request through the similarity calculation model.

S122, selecting a paragraph with the highest similarity from each article.

For example, after completing the similarity calculation, a paragraph having the largest similarity to the search request "How is Baidu's stock today" can be selected from each of the above 5 articles respectively, and 5 paragraphs are obtained.

S123, splicing a plurality of selected paragraphs to obtain the spliced text.

For example, the selected 5 paragraphs are spliced together to form a long paragraph.

For the search request such as "How is Baidu's stock today?", through organizing, it is possible to obtain a candidate paragraph as follows: "Last night, Baidu's share price finally exceeded a historical high point. On the previous day of US stock trading, Baidu's stock closed at $252.22, which had 1.83% price increase. The highest share was $254.28, which exceeded a historical peak of $251.99 since its listing, and reached a new record high. In the past National Day holidays, Baidu's stock was only a little bit away from its peak. On the 2nd October, the stock price reached a highest point at $250.57, which is only a step from the highest record of $251.99 since the listing. This increase is excited, since the stock price finally returned to the peak last night."

S130, obtaining a text segment from the spliced text.

Figure 5:
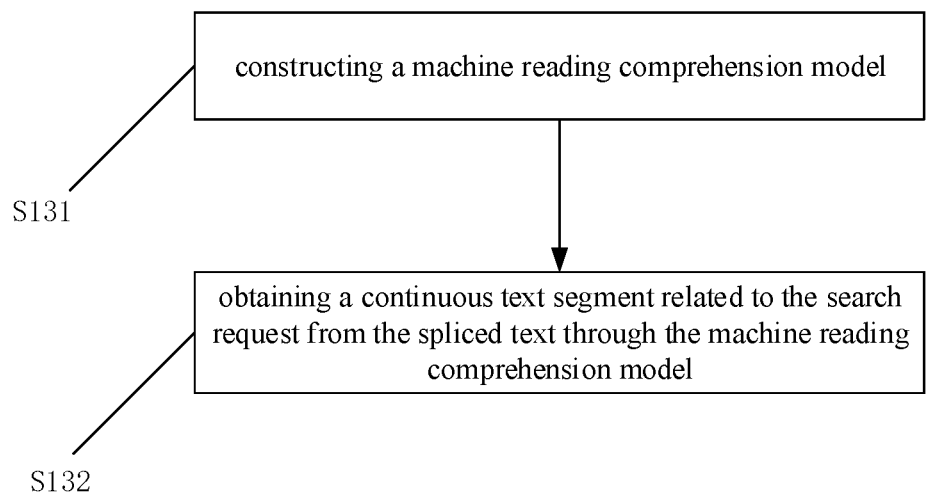
FIG. 5 is a flowchart of step S130 according to an embodiment of the present application.

In the above-mentioned spliced and organized paragraph, too much information is contained and it is too long. Therefore, it is required to be further simplified to provide corresponding information in a more targeted manner. As shown in FIG. 5, in an embodiment, when obtaining a text fragment, the following steps from S131 to S132 may be included.

S131, constructing a machine reading comprehension model.

Herein, in the reading comprehension model, a deep artificial neural network algorithm is mainly used to train a model, which can used to simulate a person to read a paragraph, and obtain the most concise and most accurate continuous text fragment in the paragraph according to the user search request. Here, training data used may include Chinese corpus such as WebQA and English corpus such as SQUAD. A common feature of these two corpora lies in that, for some given encyclopedia articles, related questions for these articles are raised, and by performing a large amount of professional labeling, answers can be made by using original text fragments in the article. These questions and corresponding answers, as well as texts from which the answers are derived are collected. When training the machine reading comprehension model, a search request corresponds to a question in the training data, paragraphs being read are texts from which an answer is derived, and the answer is an original fragment in the text.

S132: obtaining a continuous text segment related to the search request from the spliced text through the machine reading comprehension model.

For example, after the text is obtained by the machine reading comprehension model, the fragment text as obtained is "On the previous day of US stock trading, Baidu's stock closed at $252.22, which had 1.83% price increase. The highest share was $254.28."

S140: sending the obtained text segment to the search engine, to display the obtained text segment in an information search result through the search engine.

Figure 6:
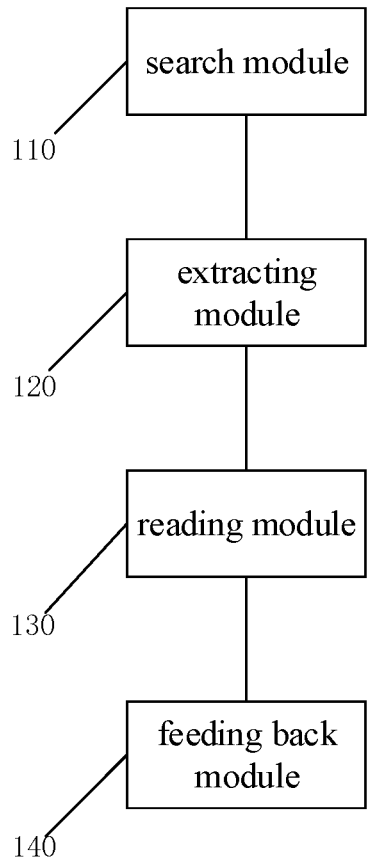
FIG. 6 is a block diagram of an information search apparatus according to another embodiment of the present application.

In another embodiment of the present application, an information search device is provided. As shown in FIG. 6, it is a block diagram of an information search device according to another embodiment of the present application. An information search device of this embodiment includes:

- a searching module 110 configured to search for webpages related to a search request through a search engine;
- an extracting module 120 configured to extract respective texts related to the search request from respective webpages and splicing the texts to obtain a spliced text;
- a reading module 130 configured to obtain a text segment from the spliced text; and
- a feeding back module 140 configured to send the obtained text segment to the search engine, to display the obtained text segment in an information search result through the search engine.

Figure 7:
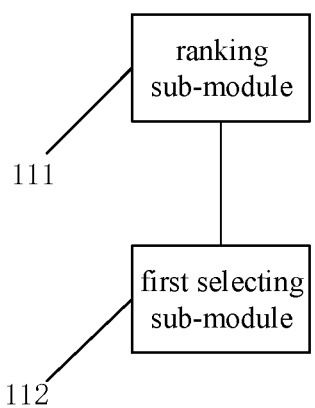
FIG. 7 is a connection block diagram of a searching module according to another embodiment of the present application.

As shown in FIG. 7, in an embodiment, the searching module 110 includes:

- a ranking sub-module 111 configured to rank articles in the webpages in a descending order, according to relevance degrees of the articles with the search request; and
- a first selecting sub-module 112 configured to select N articles with the highest relevance degrees with the search request from a ranking result, wherein N is a preset integer.

Figure 8:
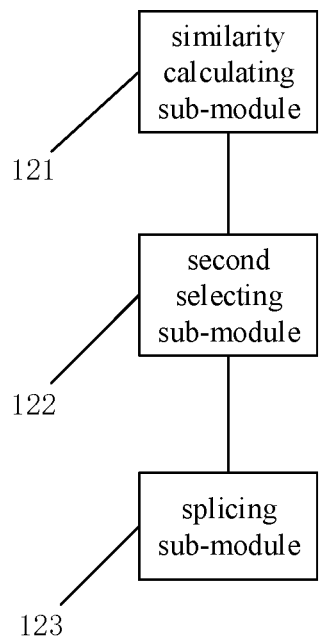
FIG. 8 is a connection diagram of an extraction module according to another embodiment of the present application.

As shown in FIG. 8, in an embodiment, the extracting module 120 includes:

- a similarity calculating sub-module 121 configured to calculate a similarity of each paragraph of each searched article with the search request;
- a second selecting sub-module 122 configured to select a paragraph with the highest similarity from each article; and
- a splicing sub-module 123 configured to splice a plurality of selected paragraphs to obtain the spliced text.

Figure 9:
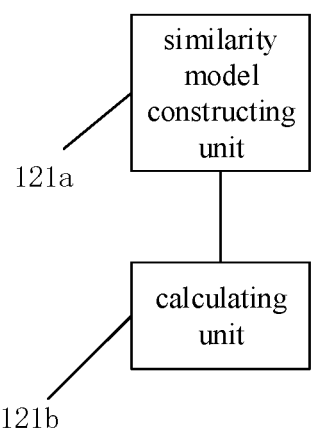
FIG. 9 is a connection block diagram of a similarity calculation sub-module according to another embodiment of the present application.

As shown in FIG. 9, in an embodiment, the similarity calculating sub-module 121 includes:

- a similarity model constructing unit 121a configured to construct a similarity calculation model for a paragraph and the search request;
- a calculating unit 121b configured to calculate a similarity of each paragraph of the searched article with the search request through the similarity calculation model.

Figure 10:
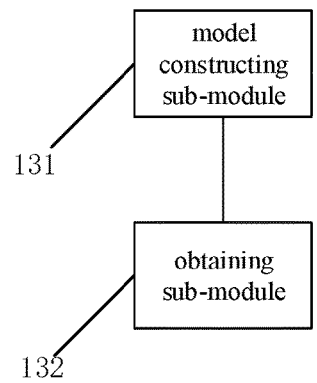
FIG. 10 is a link diagram of a reading module according to another embodiment of the present application.

As shown in FIG. 10, in an embodiment, the reading module 130 includes:

- a model constructing sub-module 131 configured to construct a machine reading comprehension model;
- an obtaining sub-module 132 configured to obtain a continuous text segment related to the search request from the spliced text through the machine reading comprehension model.

In this embodiment, functions of modules in the device refer to the corresponding description of the above mentioned method and thus the description thereof is omitted herein.

Figure 11:
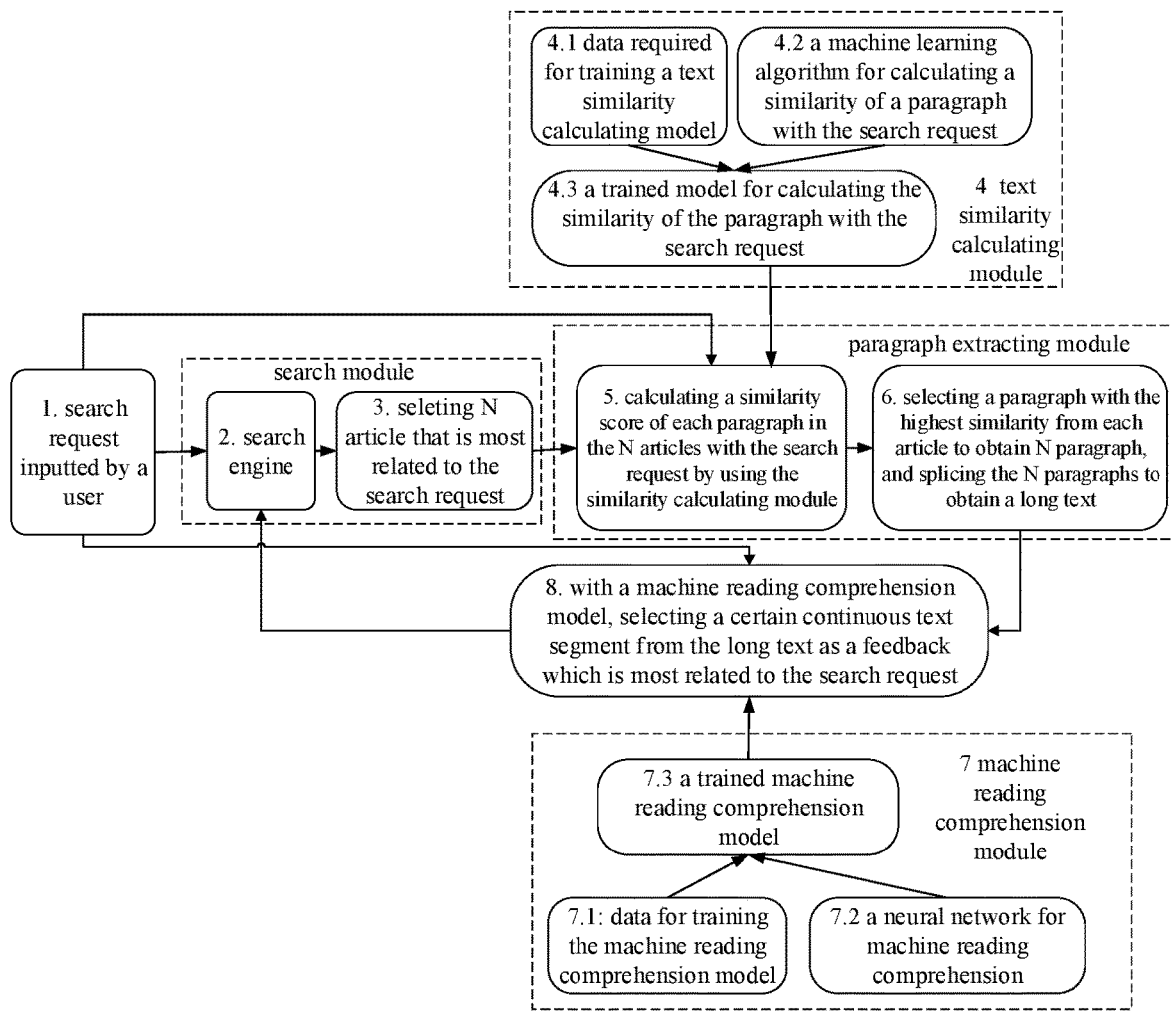
FIG. 11 is a schematic diagram of an application example of an information search apparatus according to another embodiment of the present application.

As shown in FIG. 11, the information search device of this embodiment can be implemented by using following components and modules. Input and output data and functions of each component and module are described in the following:

Component 1. A user request receiver for receiving a search request inputted by a user.

Input: A text search request Q entered by the user to a search engine.

Output: The text search request Q in the form of a string.

Function: As the input of the whole system, the text search request Q inputted in this component can be used in a subsequent search component, a text similarity calculation component, and a machine reading comprehension component.

A search module including component 2 and component 3 is detailed as follows:

Component 2. A search engine that is configured to search for webpages.

Input: The search request Q inputted by the user.

Output: webpages related to the search request Q searched from massive webpages in a background index library by using the search engine.

Function: The search engine provides a search function in massive texts of the background index library.

Component 3: an article selecting component.

Input: All articles in the webpages related to the search request Q, which are provided by the search engine.

Output: Ranking the articles in a descending order according to the relevance degrees of these articles with the search request, and selecting N articles which are most relevant to the search request Q.

Function: Through the search algorithm, the N articles which are most relevant to the search request are selected. The texts of these N articles vary in length and each article has at least one paragraph. Paragraphs can be selected from these N articles through a text similarity calculating model to further determine what needs to be fed back.

Module 4. A text similarity calculating module:

Input: Data required for training a text similarity calculating model (4.1), and a machine learning algorithm (4.2) for calculating a similarity of a paragraph with the search request.

Output: A trained model (4.3) for calculating the similarity of the paragraph with the search request.

Function: By using a machine learning algorithm, a model for calculating a similarity of the search request Q with a paragraph in the article is trained. Training data includes: Chinese corpus and English corpus, and the like.

A paragraph extracting module including a component 5 and a component 6, is detailed as follows.

Component 5: A similarity score calculating component.

Input: The most relevant N articles with the search request Q selected by the search engine, and the text similarity calculating model provided by the component 4.

Output: A similarity score of each paragraph in the N articles with the search request Q.

Function: The similarity of the search request Q with each paragraph in the N articles is calculated by using the text similarity calculating model. These similarity scores can be used to estimate an existence possibility of information (text fragments) in each paragraph of the N articles to be finally fed back.

Component 6. A candidate paragraph constructing component:

Input: All paragraphs of the N articles most relevant to the search request, and the similarity scores of corresponding to all paragraphs outputted by component 5.

Output: A text paragraph that serves as a candidate paragraph for information fragment to be finally fed back.

Function: For each article of the N articles, a paragraph with the highest similarity to the text of the search request Q is selected, so that N paragraphs (one paragraph for each article) are obtained in total, and then the N paragraphs are spliced together to form a long paragraph (as a candidate paragraph).

Module 7. A machine reading comprehension module

Input: Data (7.1) for training the machine reading comprehension model, and an artificial neural network (7.2) for machine reading comprehension.

Output: A trained machine reading comprehension model (7.3).

Function: By using a deep artificial neural network algorithm, a model that can simulate a person to read a paragraph, and obtain the most concise and most accurate continuous text fragment in the paragraph according to the search request is trained.

Component 8. Selecting the concise, accurate information as final feedback, i.e. the continuous text fragment.

Input: Search request Q, a candidate paragraph as the final feedback as selected and outputted by the component 6, and the machine reading comprehension model outputted by the module 7.

Output: A continuous text fragment that is finally fed back to the user.

Function: The search request Q and the candidate paragraph obtained in the component 6 are input to the machine reading comprehension model trained by the module 7. By using the machine reading comprehension model, a continuous text fragment in this candidate paragraph is outputted as the most appropriate feedback to the search request. Finally, the feedback information fragment is returned to the search engine (i.e., component 2) for presenting to the user.

In an embodiment of the present application, the texts related to the search request may be extracted from the searched webpages, and then the splicing and obtaining may be performed, so that the obtained text fragment is displayed in the information search result by the search engine. It is beneficial to directly presenting a short text with higher relevance to the search request to the user, thereby saving the time for screening the user information and satisfying user requirement for an intelligent search result in scenarios such as an intelligent question and answer.

Figure 12:
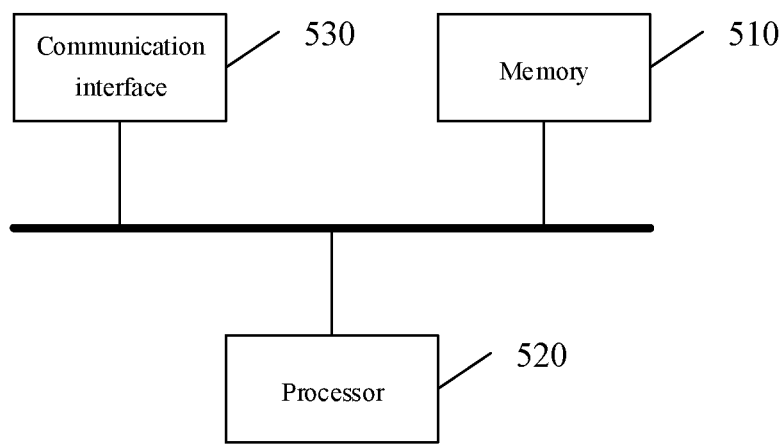
FIG. 12 is a block diagram of an information search device in accordance with another embodiment of the present application.

In another embodiment, the present application also provides an information search apparatus, as shown in FIG. 12, including a memory 510 and a processor 520. The memory 510 stores a computer program executable on the processor 520. When the processor 520 executes the computer program, the information search method in the foregoing embodiment is implemented. The number of the memory 510 and the processor 520 may be one or more.

The information search apparatus further includes:

a communication interface 530 configured to communicate with an external device and exchange data.

The memory 510 may include a high-speed RAM memory and may also include a non-volatile memory, such as at least one magnetic disk memory.

If the memory 510, the processor 520, and the communication interface 530 are implemented independently, the memory 510, the processor 520, and the communication interface 530 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 12, but it does not mean that there is only one bus or one type of bus.

Optionally, in a specific implementation, if the memory 510, the processor 520, and the communication interface 530 are integrated on one chip, the memory 510, the processor 520, and the communication interface 530 may implement mutual communication through an internal interface.

According to an embodiment of the present application, a computer-readable storage medium is provided for storing computer software instructions, which include programs involved in execution of the above information search method.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

In summary, the embodiment of the present application can bring great advantages to the search engine in terms of user experience and interaction, and can satisfy the user requirements for a function of an intelligent question and answer. In most cases, users of search engines do not want to know all the information about the object being searched when they are performing a search, but just want to get an accurate answer to the question they want to know, such as a paragraph, a sentence, or even two or three words, which can well meet the needs of users.

In addition, in the embodiment of the present application, by determining the similarity, the search result can be more closely matched with the search request. At the same time, in the embodiment of the present application, the similarity calculation is performed by constructing the deep neural network model. It is possible to avoid a disadvantage in the existing similarity calculation only through the word frequency. At the same time, in the embodiment of the present application, all information in the webpages or the articles can be further understood by constructing a machine reading comprehension model to obtain more accurate information.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. An information search method, implemented by circuits for implementing functions, comprising:
receiving, through a search engine, a search request;
searching, through the search engine, for webpages related to the search request in a database;
receiving, through a paragraph extracting module, the search request and articles in the webpages related to the search request returned by the search engine;
calculating, through the paragraph extracting module, a similarity between the search request and each paragraph in the articles in the webpages related to the search request, selecting a paragraph with A highest similarity from each article to obtain a plurality of selected paragraphs, and splicing the plurality of selected paragraphs end to end to obtain one spliced text;

inputting the search request and the spliced text into a machine reading comprehension model, obtaining from the machine reading comprehension model a continuous text segment related to the search request, wherein the obtained continuous text segment is extracted from the spliced text and is a part of the spliced text; and sending, by a processor, the obtained continuous text segment to the search engine, to display the obtained continuous text segment in an information search result through the search engine, wherein the machine reading comprehension model is obtained by training a deep artificial neural network algorithm with training data;

wherein training the machine reading comprehension model includes:

using a question in the training data as a search request input into the machine reading comprehension model, and using an original fragment in the training data as an expected output of the machine reading comprehension model, the original fragment in the training data being annotated in advance as an answer to the question;

wherein the training data includes Chinese corpus and English corpus obtained by: collecting a number of user search requests and corresponding web pages or articles respectively returned by search engines, and labeling a text fragment in paragraphs of a corresponding returned web page or article corresponding to a user search request as an answer to the user search request.

2. The information search method according to claim 1, wherein searching for webpages related to a search request through the search engine comprises:

ranking all articles in the webpages in a descending order, according to relevance degrees of the articles with the search request; and selecting N articles with the highest relevance degrees with the search request from a ranking result, wherein N is a preset integer.

3. The information search method according to claim 1, wherein calculating a similarity between the search request and each paragraph in the articles in the webpages related to the search request comprises:

constructing a similarity calculation model for a paragraph and the search request; and calculating the similarity between each paragraph in the articles in the webpages related to the search request with and the search request through the similarity calculation model.

4. An information search device, implemented by circuits for implementing functions, comprising: one or more processors; and a storage device configured for storing one or more programs, wherein the one or more programs are executed by the one or more processors to enable the one or more processors to:

receive, through a search engine, a search request:

search, through the search engine, for webpages related to the search request in a database;

receive, through a paragraph extracting module, the search request and articles in the webpages related to the search request returned by the search engine:

calculate, through the paragraph extracting module, a similarity between the search request and each paragraph in the articles in the webpages related to the search request, select a paragraph with a highest similarity from each article to obtain a plurality of selected paragraphs, and splice the plurality of selected paragraphs end to end to obtain one spliced text;

input the search request and the spliced text into a machine reading comprehension model, obtain from the machine reading comprehension model a continuous text segment related to the search request, wherein the obtained continuous text segment is extracted from the spliced text and is a part of the spliced text; and send the obtained continuous text segment to the search engine, to display the obtained continuous text segment in an information search result through the search engine, wherein the machine reading comprehension model is obtained by training a deep artificial neural network algorithm with training data;

wherein training the machine reading comprehension model includes:

using a question in the training data as a search request input into the machine reading comprehension model, and using an original fragment in the training data as an expected output of the machine reading comprehension model, the original fragment in the training data being annotated in advance as an answer to the question:

wherein the training data includes Chinese corpus and English corpus obtained by: collecting a number of user search requests and corresponding web pages or articles respectively returned by search engines, and labeling a text fragment in paragraphs of a corresponding returned web page or article corresponding to a user search request as an answer to the user search request.

5. The information search device according to claim 4, wherein the one or more programs are executed by the one or more processors to enable the one or more processors further to:

rank all articles in the webpages in a descending order, according to relevance degrees of the articles with the search request; and select N articles with the highest relevance degrees with the search request from a ranking result, wherein N is a preset integer.

6. The information search device according to claim 4, wherein the one or more programs are executed by the one or more processors to enable the one or more processors further to:

construct a similarity calculation model for a paragraph and the search request; and calculate the similarity between each paragraph in the articles in the webpages related to the search request and the search request through the similarity calculation model.

7. A non-transitory computer-readable storage medium, in which a computer program is stored, implemented by circuits for implementing functions, wherein the computer program, when executed by a processor, causes the processor to perform operations comprising:

receiving, through a search engine, a search request:

searching, through the search engine, for webpages related to the search request in a database;

receiving, through a paragraph extracting module, the search request and articles in the webpages related to the search request returned by the search engine;

calculating, through the paragraph extracting module, a similarity between the search request and each paragraph in the articles in the webpages related to the search request, selecting a paragraph with a highest similarity from each article to obtain a plurality of selected paragraphs, and splicing the plurality of selected paragraphs end to end to obtain one spliced text;

inputting the search request and the spliced text into a machine reading comprehension model, obtaining from the machine reading comprehension model a continuous text segment related to the search request, wherein the obtained continuous text segment is extracted from the spliced text and is a part of the spliced text; and sending the obtained continuous text segment to the search engine, to display the obtained continuous text segment in an information search result through the search engine, wherein the machine reading comprehension model is obtained by training a deep artificial neural network algorithm with training data;

wherein training the machine reading comprehension model includes:

using a question in the training data as a search request input into the machine reading comprehension model, and using an original fragment in the training data as an expected output of the machine reading comprehension model, the original fragment in the training data being annotated in advance as an answer to the question;

wherein the training data includes Chinese corpus and English corpus obtained by: collecting a number of user search requests and corresponding web pages or articles respectively returned by search engines, and labeling a text fragment in paragraphs of a corresponding returned web page or article corresponding to a user search request as an answer to the user search request.

8. The non-transitory computer-readable storage medium of claim 7, wherein the computer executable instructions, when executed by a processor, cause the processor to perform further operations comprising:

Ranking all articles in the webpages in a descending order, according to relevance degrees of the articles with the search request; and selecting N articles with the highest relevance degrees with the search request from a ranking result, wherein N is a preset integer.

9. The non-transitory computer-readable storage medium of claim 7, wherein the computer executable instructions, when executed by a processor, cause the processor to perform further operations comprising:

constructing a similarity calculation model for a paragraph and the search request; and calculating the similarity between each paragraph in the articles in the webpages related to the search request and the search request through the similarity calculation model.

* * * * *

UNITED STATES PATENT AND TRADEMARK OFFICE
CERTIFICATE OF CORRECTION

| | |
|---|---|
| PATENT NO. | : 11,977,589 B2 |
| APPLICATION NO. | : 15/733467 |
| DATED | : May 7, 2024 |
| INVENTOR(S) | : Miao Fan et al. |

It is certified that error appears in the above-identified patent and that said Letters Patent is hereby corrected as shown below:

In the Claims

Column 12, Claim 1, Line 57:
"a search request:" should read: -- a search request; --.

Column 12, Claim 1, Line 63:
"search engine:" should read: -- search engine; --.

Column 12, Claim 1, Line 66:
"with A highest" should read: -- with the highest --.

Column 13, Claim 3, Lines 50-51:
"search request with and the" should read: -- search request and the --.

Column 13, Claim 4, Line 60:
"search request:" should read: -- search request; --.

Column 13, Claim 4, Line 65:
"search engine:" should read: -- search engine; --.

Column 14, Claim 4, Line 28:
"the question:" should read: -- the question; --.

Column 14, Claim 7, Line 62:
"search request:" should read: -- search request; --.

Signed and Sealed this
Thirtieth Day of July, 2024

Katherine Kelly Vidal
*Director of the United States Patent and Trademark Office*